United States Patent [19]
Fujikawa et al.

[11] Patent Number: 5,719,647
[45] Date of Patent: Feb. 17, 1998

[54] REFLECTIVE TYPE LIQUID CRYSTAL DISPLAY APPARATUS HAVING ESD PROTECTING MIM BENEATH EACH REFLECTIVE ELECTRODE

[75] Inventors: Yohsuke Fujikawa, Tenri; Toshiaki Fukuyama, Nara; Toshiyuki Yoshimizu, Soraku-gun, all of Japan

[73] Assignee: Sharp Kabushiki Kaisha, Osaka, Japan

[21] Appl. No.: 556,845

[22] Filed: Nov. 2, 1995

[30] Foreign Application Priority Data

Nov. 8, 1994 [JP] Japan ................................ 6-273913

[51] Int. Cl.$^6$ .......................... G02F 1/1333; G02F 1/136
[52] U.S. Cl. .................................. 349/40; 349/51
[58] Field of Search ............................. 257/491, 355; 359/58, 87, 59, 60; 349/40, 51

[56] References Cited

U.S. PATENT DOCUMENTS

| | | | |
|---|---|---|---|
| 4,632,514 | 12/1986 | Ogawa et al. | 359/68 |
| 4,671,642 | 6/1987 | Ohkubo | 359/59 |
| 5,289,300 | 2/1994 | Yamazaki et al. | 359/58 |
| 5,313,319 | 5/1994 | Salisbury | 359/59 |
| 5,321,536 | 6/1994 | Ishii et al. | 359/58 |
| 5,473,451 | 12/1995 | Kazurov et al. | 359/59 |
| 5,517,048 | 5/1996 | Kosaka | 257/355 |
| 5,521,731 | 5/1996 | Fukuyama et al. | 359/54 |

FOREIGN PATENT DOCUMENTS

| | | |
|---|---|---|
| 62-58226 | 3/1987 | Japan. |
| 2-13766 | 1/1990 | Japan. |
| 2-83538 | 3/1990 | Japan. |
| 2-137828 | 5/1990 | Japan. |
| 2-304534 | 12/1990 | Japan. |
| 2-308138 | 12/1990 | Japan. |
| 3-35223 | 2/1991 | Japan. |
| 3-41420 | 2/1991 | Japan. |
| 3-45934 | 2/1991 | Japan. |
| 3-063623 | 3/1991 | Japan. |
| 3-149526 | 6/1991 | Japan. |
| 3-296024 | 12/1991 | Japan. |
| 4-114132 | 4/1992 | Japan. |
| 4-291241 | 10/1992 | Japan. |
| 5-107556 | 4/1993 | Japan. |
| 5-142578 | 6/1993 | Japan. |

OTHER PUBLICATIONS

White et al., "New Absorptive Mode Reflective Liquid-Crystal Display Device" Journal of Applied Physics, vol. 45, No. 11, pp. 4718–4723, 1974.
Koizumi et al, "Reflective Multicolor LCD (II): Improvement in the Brightness", Proceedings of the Sid, vol. 29/2, pp. 157–160, 1988.

Primary Examiner—William L. Sikes
Assistant Examiner—Walter Malinowski
Attorney, Agent, or Firm—Nixon & Vanderhye P.C.

[57] ABSTRACT

A reflective type liquid crystal display apparatus includes: a first transmissive substrate; a second substrate disposed to face the first substrate; a liquid crystal layer interposed between the first substrate and the second substrate, the liquid crystal layer including a plurality of pixels; a plurality of reflective pixel electrodes, provided on the second substrate, for applying driving voltages to the pixels; a plurality of driving devices, provided on the second substrate, for driving the reflective pixel electrodes, respectively; and a plurality of protective devices disposed in the vicinity of the driving devices on the second substrate. The driving devices and the protective devices are disposed below the reflective pixel electrodes. Each of the driving devices and the protective devices includes an insulator, electric breakdown in each of the protective devices occurs prior to electric breakdown in a corresponding one of the driving devices, thereby reducing the potential difference of static electricity applied to the corresponding one of the driving devices.

18 Claims, 11 Drawing Sheets

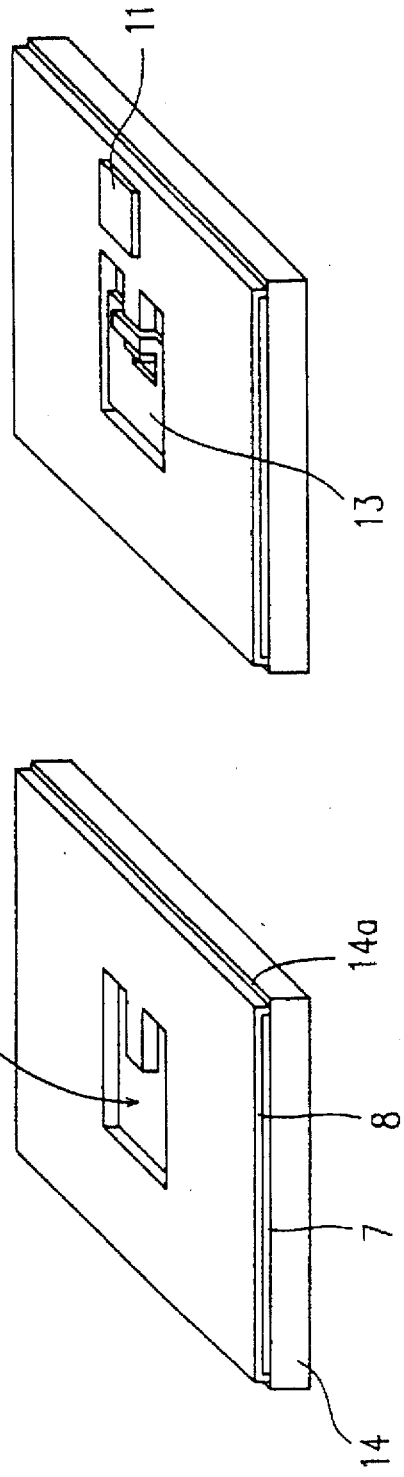
FIG.4A
FIG.4B
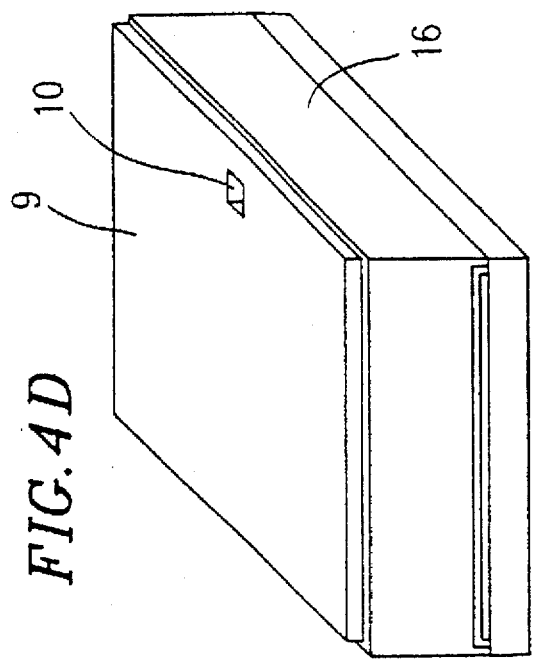
FIG.4D
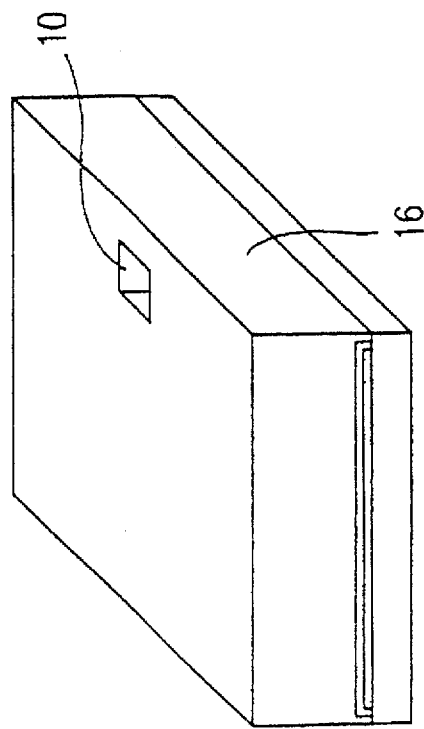
FIG.4C

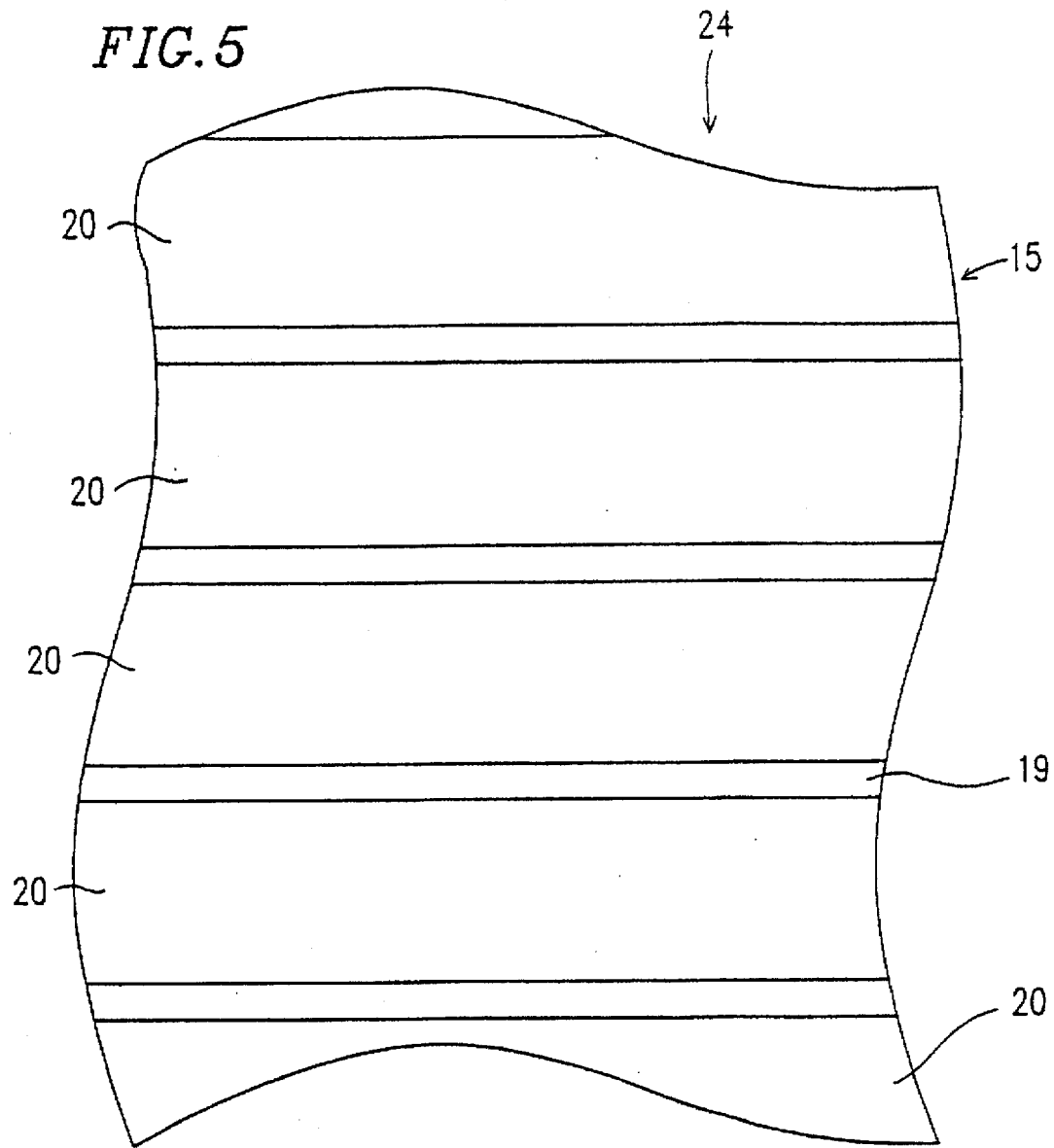

REFLECTIVE TYPE LIQUID CRYSTAL DISPLAY APPARATUS HAVING ESD PROTECTING MIM BENEATH EACH REFLECTIVE ELECTRODE

BACKGROUND OF THE INVENTION

1. Field of the Invention

The present invention relates to a reflective type liquid crystal display apparatus using an active driving device, and in particular to a reflective type liquid crystal display apparatus including a two-terminal nonlinear device such as an MIM (Metal-Insulator-Metal) device.

2. Description of the Related Art

A liquid crystal display apparatus (hereinafter, referred to as an LCD apparatus) is more excellent in display quality than a CRT, and has advantages that the apparatus is thin and light, consumes a small amount of power and has a long durability. Therefore, in recent years, the LCD apparatus has been mounted on products in a variety of fields including OA (Office Automation) and AV (audio vidual) including word processors, lap-top personal computers, portable television sets and the like. In particular, a reflective type LCD apparatus which displays an image by reflecting light introduced from the outside, does not require a backlight portion, so that power consumption can be further reduced, and the apparatus can be made thinner and lighter.

The reflective type LCD apparatus conventionally performs display in a TN (Twisted Nematic) mode or an STN (Super Twisted Nematic) mode in which a nematic liquid crystal layer is used as a display medium. However, in these display modes, at least one polarizing plate is required, so that three fourths of the amount of light entering the LCD apparatus is interrupted, resulting in a dark display.

In order to solve this problem, a mode for displaying an image without using a polarizing plate has been proposed. One of the proposed modes is a guest-host mode, which utilizes a cholesteric-nematic phase transition by application of an electric field. An LCD apparatus in such a display mode is disclosed in I. Appl. Phys. 45,4718, 1974 by D. L. White and G. N. Taylor. A micro-colored display to which this display mode is applied is proposed in Proceedings of the SID. vol. 29/2,157, 1988 by Tohru Koizumi and Tatsuo Uchida. A guest-host liquid crystal material containing a dichroic dye is used as a display medium of the LCD apparatus in this mode.

Furthermore, an LCD apparatus, which utilizes the birefringence in a liquid crystal layer and performs display by controlling an optical state of the liquid crystal layer to be a transparent state or an opaque state, has been recently proposed. This LCD apparatus neither requires a polarizing plate nor an alignment treatment. As a display medium of this LCD apparatus, a polymer dispersed liquid crystal (PDLC) layer in which liquid crystal regions are dispersed is used. The refractive index of the liquid crystal regions for ordinary light is matched with the refractive index of a supporting medium such as a polymer. The liquid crystal region is in the transparent state when a voltage is applied to align the orientation of the liquid crystal molecules in one direction, whereas the liquid crystal region is in the opaque state, i.e., a light scattering state caused by disalignment of the orientations of the liquid crystal molecules when no voltage is applied.

A further improvement in display quality is desired as a screen becomes larger and a higher level of resolution is realized. In particular, in the TN display mode, a sufficient contrast is not attained when a multiplex driving by a voltage-averaging method is conducted. Therefore, an LCD apparatus which is provided with a three-terminal nonlinear device such as a TFT (Thin Film Transistor) and a two-terminal nonlinear device such as a diode device or an MIM (Metal-Insulating-Metal) device as a switching device at each display pixel so as to perform an active matrix driving has been proposed.

The LCD apparatus provided with a three-terminal nonlinear device requires six to eight or more thin film forming steps and photolithography steps during the manufacture, resulting in a complicated manufacturing process. Accordingly, in the manufacture of such an LCD apparatus, the reduction in the manufacturing cost is the biggest challenge to be overcome. On the other hand, the LCD apparatus provided with a two-terminal nonlinear device has an advantage in the manufacturing cost over the LCD apparatus using the three-terminal nonlinear device, and is preferably used because the aperture ratio thereof can be increased as compared with the LCD apparatus having the three-terminal nonlinear device. Among LCD apparatuses including the two-terminal nonlinear devices, an LCD apparatus in which an MIM device is incorporated into each display pixel has already been put into practice.

A conventional LCD apparatus using a plurality of MIM devices as switching devices will be described referring to FIGS. 10 and 11. The LCD apparatus includes a pair of substrates and a liquid crystal layer sandwiched therebetween. FIG. 10 is a plan view showing one pixel on one substrate of the LCD apparatus. FIG. 11 is a cross sectional view taken along with a line C—C' in FIG. 10.

One substrate 101 has a glass substrate 101a; a plurality of pixel electrodes 102 formed in rows and columns on the glass substrate 101a; a plurality of strips 103, arranged to extend between adjacent columns of pixel electrodes 102 serving as signal lines; and a plurality of MIM devices 104. In FIG. 10, the MIM device 104 of each pixel is represented by the hatched portion and electrically connects the corresponding the pixel electrode 102 to the signal line 103. The MIM device 104 includes a lower electrode 103a which branches away from the signal line 103, an insulator 105 formed on the lower electrode 103a and an upper electrode 106 formed on the insulator 105. The pixel electrode 102 is formed on the glass substrate 101a overlapping the upper electrode 106 at both ends thereof, so as to be connected to the upper electrode 106.

A counter substrate (not shown) includes a glass substrate and a plurality of strips serving as counter electrodes (not shown) formed thereon. The counter substrate is attached to the substrate 101 so that the counter electrodes cross the signal line 103, and a liquid crystal material to form the liquid crystal layer is filled therebetween.

Generally, an MIM device, in which tantalum (Ta) as the material of the lower electrode 103a, a tantalum oxide ($TaO_x$) as the material of the insulator 105, and chromium (Cr), titanium (Ti) or aluminum (Al) as the material of the upper electrode 106 are used, is well-known. An LCD apparatus using such an MIM device is disclosed in Japanese Laid-Open Patent Publication Nos. 3-35223, 3-41520, 2-308138, 2-304534, 3-149526, 2-83538, 3-296024 and 4-114132 and the like.

In an LCD apparatus using the MIM device 104, a region which actually serves as a display screen (hereinafter, referred to as an actually active region) is a region where the pixel electrode 102 is formed except for the portion in which the pixel electrode 102 overlaps the upper electrode 106.

The remaining region where, for example, the signal line 103, the gap between the pixel electrode 102 and the corresponding signal line 103, the gap between the adjacent pixel electrodes 102, or the MIM device 104 is formed, do not function as a part of the actually active region. Therefore, an aperture ratio, namely, a ratio of an area of the actually active region to the area of the entire screen, is in the range from 50% to 80%. However, in recent years, in order to perform display with high definition, the density of the pixels, i.e., the number of the pixels within a unit area has been required to be increased, resulting in reducing the aperture ratio. This deteriorates display quality.

To overcome the problem of the deterioration in display quality, a reflective type LCD apparatus in which the aperture ratio is improved is proposed in Japanese Laid-Open Patent Publication No. 6-235940. In this reflective type LCD apparatus, a signal line is used as a lower electrode, and a pixel electrode which functions as a reflector as well is used as an upper electrode of the MIM device. An insulator of the MIM device is formed on the signal line. Thus, there is no region where only at least either the signal line or the MIM device which fails to actually function as a display screen exists. As a result, it is possible to narrow the gap between the adjacent pixels and enlarge an area of each pixel. Therefore, the aperture ratio can be improved, so that even in a reflective type LCD apparatus utilizing surrounding light, a bright display can be obtained. This leads to the improvement in display quality. Furthermore, since this reflective type LCD apparatus also adopts a display mode which does not necessitate any polarizing plate, the absorption of light entering the LCD apparatus by the polarizing plate does not occur, thereby obtaining further brightness in display.

The thickness of the insulating layer of the above MIM device is generally on the order of 500 Å, so that the MIM's ability to withstand the affects of static electricity is low. As a result, electric breakdown of the MIM device is easily caused by static electricity generated during the manufacturing process of the LCD apparatus, resulting in the short-circuit of the upper and lower electrodes of the MIM device. After short circuiting, the MIM device is no more able to function as a nonlinear device.

In order to prevent such a short circuitry problem resulting from static electricity, countermeasures, for example, the improvement in a pattern layout such as an arrangement pattern of a common electrode, the control of humidity during a manufacturing process, the provision of a ground by an operator, and the addition of a process such as an ion shower, are taken. However, the electric breakdown in the MIM device can not be completely prevented.

In order to protect the MIM device from an electric breakdown caused by static electricity, a method in which a dummy MIM device is formed as a protective device outside a display region is disclosed in Japanese Laid-Open Patent Publication Nos. 62-58226, 2-13766, 2-137828, 3-45934, 4-291241, and 5-142578. The insulation of this dummy MIM device is destroyed by static electricity generated during a manufacturing process prior to the creation of the insulation in the driving MIM device so as to reduce the potential difference of the static electricity and thus protect the driving MIM device.

However, in such a conventional dummy MIM method, even larger space is required for the liquid crystal cell, because such a protective dummy device is formed outside the display pixel area. In addition, it is difficult to cope with the electric breakdown of the driving MIM device which is suddenly caused by static electricity in an arbitrary row or column in an array of the display pixels.

SUMMARY OF THE INVENTION

A reflective type liquid crystal display apparatus according to the present invention includes: a first transmissive substrate; a second substrate disposed to face the first substrate; a liquid crystal layer interposed between the first substrate and the second substrate, the liquid crystal layer including a plurality of pixels; a plurality of reflective pixel electrodes, provided on the second substrate, for applying driving voltages to the pixels; a plurality of driving devices, provided on the second substrate, for driving the reflective pixel electrodes, respectively; and a plurality of protective devices disposed in the vicinity of the driving devices on the second substrate. The driving devices and the protective devices are disposed below the reflective pixel electrodes. Each of the driving devices and the protective devices includes an insulator, electric breakdown in each of the protective devices occurs prior to electric breakdown in a corresponding one of the driving devices, whereby reducing a potential difference of static electricity applied to the corresponding one of the driving devices.

In one embodiment of the invention, the driving devices and the protective devices are MIM devices.

In another embodiment of the invention, the reflective type liquid crystal display apparatus further includes: a plurality of wirings, provided on the second substrate, for supplying the driving voltages to the reflective pixel electrodes via the driving devices, the wirings being formed of a conductive material; an insulating layer formed on the plurality of wiring; a conductive layer formed on the insulating layer. The insulator of each of the driving devices and the protective devices is a part of the insulating layer, and the each of the driving devices and the protective devices includes a part of a corresponding one of the wirings as a lower electrode.

In still another embodiment of the invention, the reflective type liquid crystal display apparatus further includes another insulating layer which has contact holes and is provided between the conductive layer and the reflective pixel electrodes, the reflective pixel electrodes being respectively connected to the driving devices through the contact holes.

In still another embodiment of the invention, each of the protective devices includes a part of the conductive layer as an upper electrode.

In still another embodiment of the invention, each of the driving devices includes a part of the conductive layer as an upper electrode, and the upper electrode is connected to a corresponding one of the reflective pixel electrodes through a corresponding one of the contact holes.

In still another embodiment of the invention, each of the reflective pixel electrodes includes a portion connected to the conductive layer through a corresponding one of the contact holes, the portion serving as an upper electrode of a corresponding one of the driving devices.

In still another embodiment of the invention, the withstand voltage of the protective devices is lower than the withstand voltage of the driving devices.

In still another embodiment of the invention, the size of each of the protective devices is equal to or less than ¼ of the size of each of the driving devices.

In still another embodiment of the invention, one protective device is disposed in the vicinity of each of the driving devices.

In still another embodiment of the invention, two or more protective devices are disposed in the vicinity of each of the driving devices.

In still another embodiment of the invention, the liquid crystal layer is a guest-host liquid crystal layer.

In still another embodiment of the invention, the guest-host liquid crystal layer is either one of a host nematic liquid crystal layer containing a dichroic dye as a guest molecule, a host cholesteric liquid crystal layer containing a dichroic dye as a guest molecule, and a polymer resin layer in which liquid crystal regions are dispersed.

In still another embodiment of the invention, the reflective type liquid crystal display apparatus further includes a plurality of common electrodes provided on the first substrate to cross the plurality of wirings on the second substrate, wherein the plurality of reflective pixel electrodes are disposed in regions where the common electrodes and the wirings are overlapped.

Thus, the invention described herein makes possible the advantage of providing a reflective type LCD apparatus capable of displaying an image with fewer pixel defects without enlarging the size of the liquid crystal display cell.

This and other advantages of the present invention will become apparent to those skilled in the art upon reading and understanding the following detailed description with reference to the accompanying figures.

BRIEF DESCRIPTION OF THE DRAWINGS

FIGS. 4A to 4D are perspective views showing each manufacturing step of the substrate of the reflective type LCD apparatus of Example 1 according to the present invention.

FIG. 5 is a plan view of a counter substrate of the reflective type LCD apparatus of Example 1 according to the present invention.

DESCRIPTION OF THE PREFERRED EMBODIMENTS

The present invention will now be described by way of examples.

EXAMPLE 1

Figure 1:
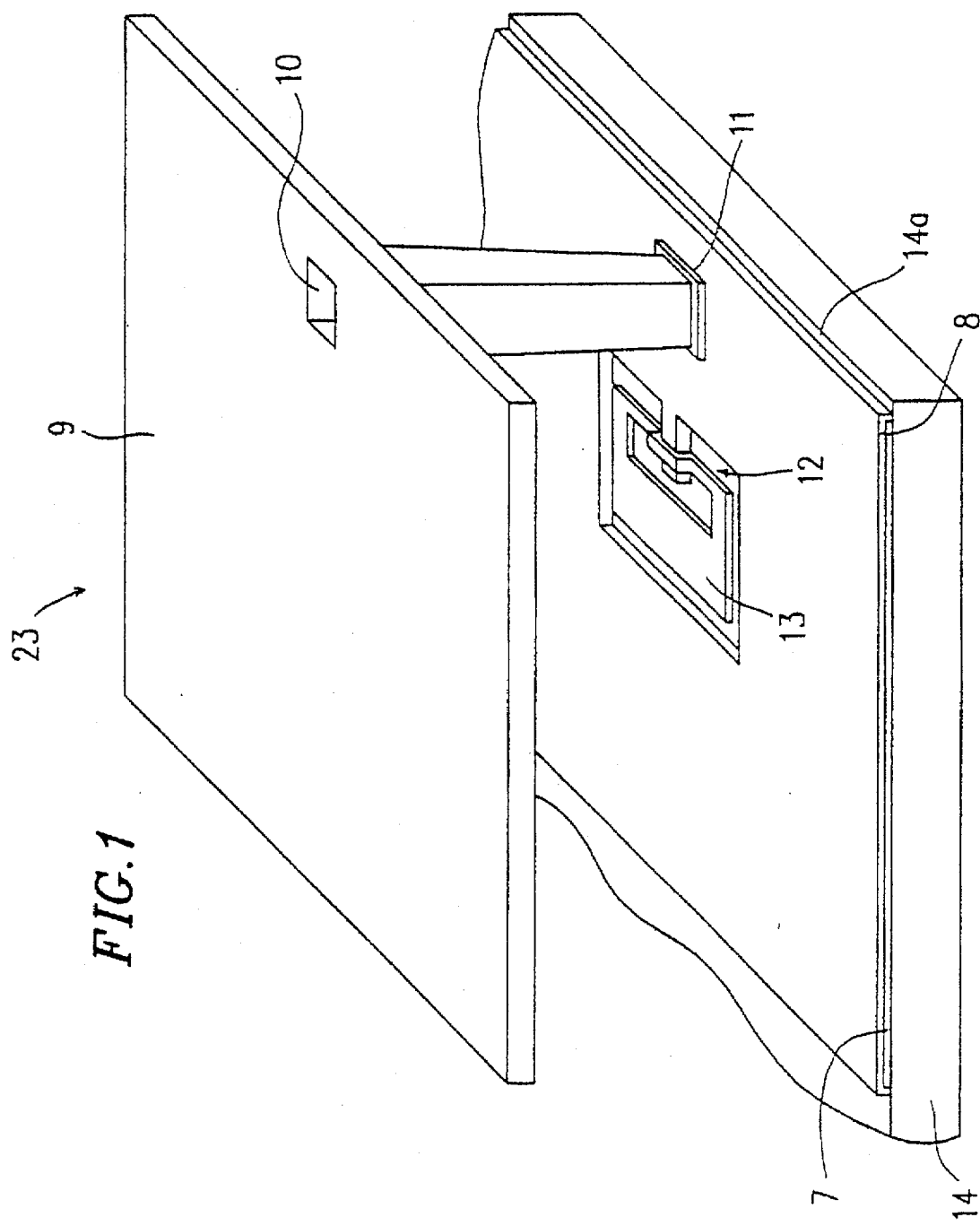
FIG. 1 is a cross sectional and perspective view of one pixel on one substrate of a reflective type LCD apparatus of Example 1 according to the present invention.
Figure 2:
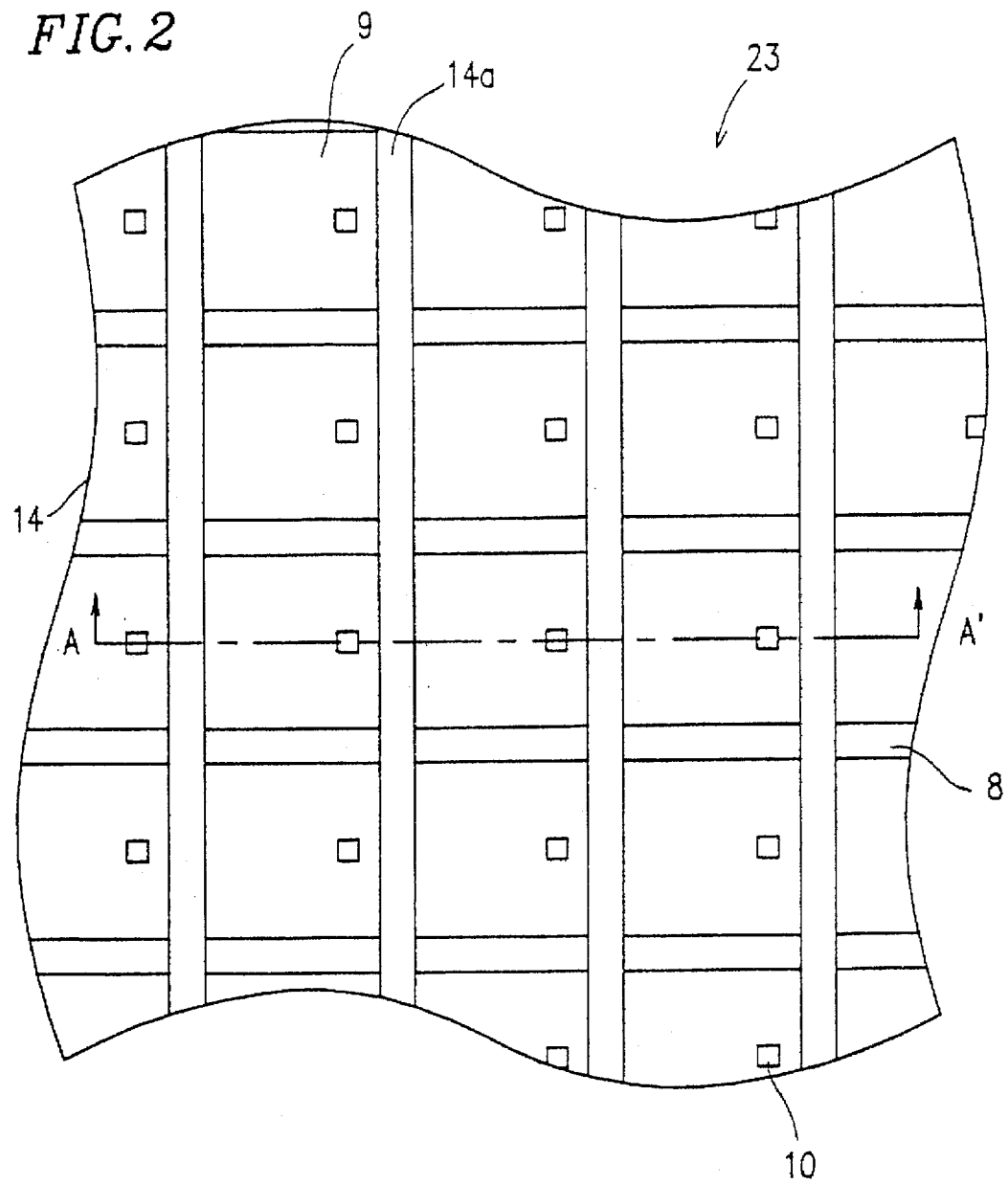
FIG. 2 is a plan view of the substrate of the reflective type LCD apparatus of Example 1 according to the present invention.
Figure 3:
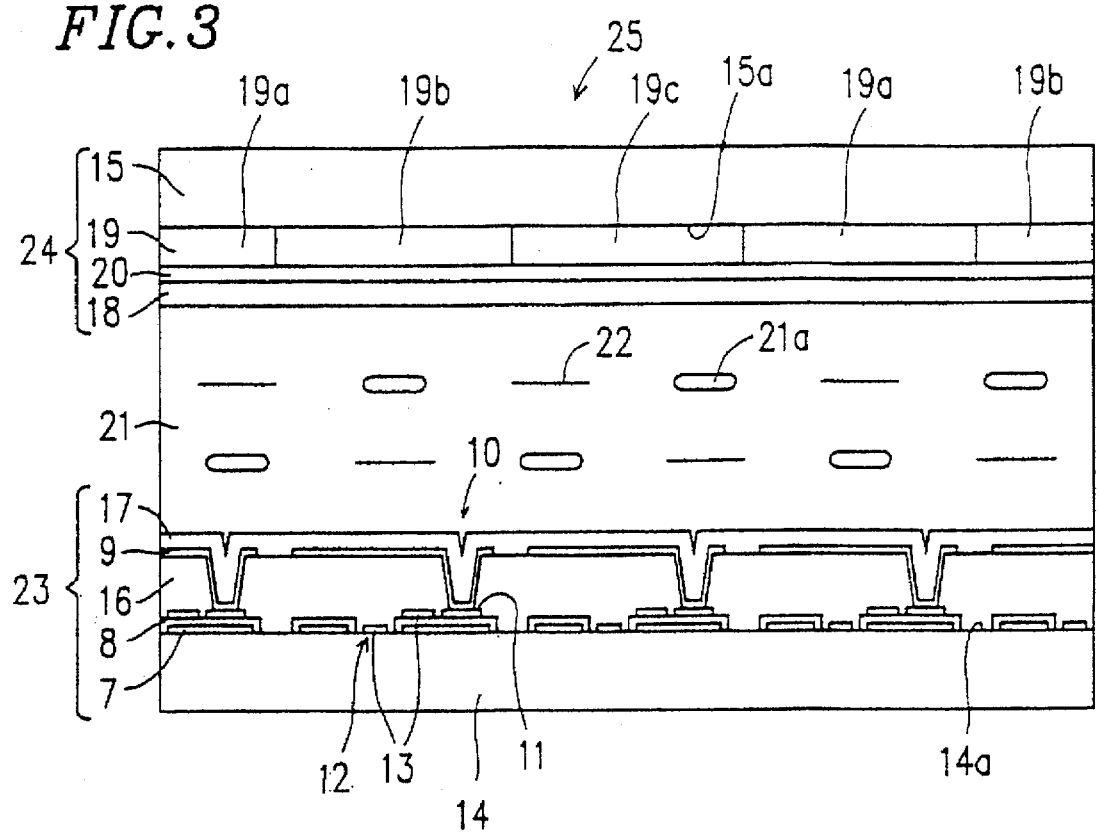
FIG. 3 is a cross sectional view of the reflective type LCD apparatus taken along the line A—A' in FIG. 2.

FIG. 1 is a cross sectional and perspective view of one pixel on a substrate having MIM devices formed thereon in a reflective type LCD apparatus of this example, while FIG. 2 is a plan view thereof. FIG. 3 is a cross sectional view of the LCD of this example taken along a line A—A' in FIG. 2.

The LCD apparatus includes a pair of substrates 23 and 24 as shown in FIG. 3 and a liquid crystal layer 21. First, the substrate 23 will be described below. The substrate 23 includes an insulating substrate 14. On a surface 14a of the insulating substrate 14, a plurality of strips of a first conductive layer 7 are formed at a predetermined interval. These strips serve as signal lines. An insulating layer 8 is formed on the first conductive layer 7. An upper electrode 11 of a driving device and an upper electrode 13 of a protective device are formed of a metal thin film on the insulating layer 8. A second insulating layer 16, which is not shown in FIG. 1 for the sake of simplicity, is also formed on the insulating layer 8. On the second insulating layer 16, a second conductive layer 9, which functions as a pixel electrode and a reflector, is formed. The second conductive layer 9 is patterned in a matrix so that the pixel electrodes are positioned at regions where common electrodes 20 (shown in FIG. 3) formed on the counter substrate 24 overlap the signal lines 7 on the substrate 23 when the substrates 23 and 24 are attached. Furthermore, a protecting film 17, which is not shown in FIG. 1 for the sake of simplicity, is formed over the entire substrate 23, covering the second conductive layer 9, in order to improve smoothness.

A driving device as a two-terminal nonlinear device having a metal-insulator-metal structure, which is provided at each display pixel, consists of the first conductive layer 7, the insulating layer 8 and the upper electrode 11. The upper electrode 11 is connected to the second conductive layer 9 through a contact hole 10 provided through the second insulating layer 16. In the vicinity of the driving MIM device below the second conductive layer 9, i.e., in a region 12, the protective device as a two-terminal nonlinear device having a metal-insulator-metal structure is formed. The protective MIM device consists of the first conductive layer 7, the insulating layer 8 and the upper electrode 13. In this way, according to the present example, the protective device is formed below the reflective pixel electrode 9. Therefore, the area of the actually active region which contributes to display is not reduced by providing the protective device within the display pixel, unlike the conventional apparatus.

The substrate 23 thus fabricated is attached to the counter substrate 24 on which a color filter 19, the counter electrodes 20 and a protecting film 18 are formed in this order. Between the substrate 23 and the counter substrate 24, a display medium layer 21 made of a guest-host liquid crystal material containing a dichroic dye is injected and interposed. In this way, a reflective type LCD apparatus 25 is constructed, thereby obtaining an LCD apparatus of a so-called white tailor type display mode, which does not necessitate a polarizing plate.

Hereinafter, an exemplary method of fabricating the reflective type LCD apparatus 25 having the above-mentioned structure in more detail, referring to FIGS. 4A through 4D.

First, as shown in FIG. 4A, the first conductive layer 7 is deposited entirely on the surface 14a of the insulating substrate 14. In this example, tantalum (Ta) is used as the material of the first conductive layer 7, and the deposition is performed to obtain the layer having: a resistivity in the range of 60 µΩ·cm to 180 µΩ·cm, and more preferably, 120 µΩ·cm; a thickness in the range from 1000 Å to 4000 Å, and more preferably, 2500 Å or less; and a dielectric constant of 21.5 or less. The deposition of the first conductive layer 7 is performed by a reactive sputtering, or a sputtering using a sintered material of the first conductive layer as a target, for example. The deposited conductive layer 7 is then patterned by wet etching, dry etching or the like, to form a region 12 for the protective MIM device where the surface 14a of the substrate 14 is exposed. Next, an insulating layer 8 is formed on the surface of the first conductive layer 7, for example, by anodizing the first conductive layer 7. As the insulating layer 8, for example, tantalum oxide ($TaO_x$) can be used. A thickness of the insulating layer 8 is in the range from 200 Å to 800 Å.

Alternatively, the first conductive layer 7 and the insulating layer 8 may be formed in the following manner. After the first conductive layer 7 is deposited, the insulating layer 8 is formed over the entire surface of the first conductive layer 7 prior to patterning of the first conductive layer 7. Then, the first conductive layer 7 and the insulating layer 8 are patterned by photolithography and dry etching, thereby exposing a part of the surface 14a of the substrate 14 to form the region 12 for the protective MIM device.

Next, as shown in FIG. 4B, a metal thin film is deposited over the substrate 14 entirely to cover the first conductive layer 7 and the insulating layer 8, and is then patterned by, for example, photolithography and etching so as to form the upper electrode 11 of the driving MIM device and the upper electrode 13 of the protective MIM device. The upper electrode 11 and the upper electrode 13 are provided for each display pixel. As the material of this metal thin film used as the upper electrodes of the MIM devices, for example, titanium (Ti) can be used. The metal thin film is formed to have a thickness in the range from 2000 Å to 4000 Å.

Furthermore, as shown in FIG. 4C, a second insulating layer 16 is formed on the entire substrate 14 to cover the first conductive layer 7, the insulating layer 8 and the upper electrodes 11 and 13. Then, a part of the second insulating layer 16 is removed by, for example, photolithography and dry etching so as to form a contact hole 10. As the second insulating layer 16, an organic insulating layer made of photosensitive resin such as a polyimide resin or an acrylic resin can be used. The second insulating layer 16 is formed to have a thickness in the range from 0.5 µm to 3 µm, and more preferably, 2 µm. In this example, a polyimide resin film having a thickness of 2 µm is formed as the second insulating layer 16. The contact hole 10 is formed on each upper electrode 11 of the driving MIM device. A cross-sectional area of one contact hole 10 is in the range from 2 $µm^2$ to 100 $µm^2$, and more preferably, 25 $µm^2$.

Thereafter, as shown in FIG. 4D, a second conductive layer 9 is deposited over the entire surface 14a of the substrate 14 to cover the second insulating layer 16. Thus, the second conductive layer 9 is connected to the upper electrode 11 of the driving MIM device through the contact hole 10. As the material of the second conductive layer 9, a conductive material which is optically reflective, such as aluminum (Al), is used. The thickness of the second conductive layer 9 is in the range from 500 Å to 3000 Å, and more preferably, 2000 Å. Then, the second conductive layer 9 is patterned so that the second conductive layer 9 only exists in regions where the counter electrodes 20 are to overlap the signal lines 7 when the counter substrate 24 is disposed on the substrate 23. The second conductive layer 9 in each region serves as both the pixel electrode and the reflector in each display pixel.

The surface of the second insulating layer 16 and/or the second conductive layer 9 may be roughened, or may include a plurality of minor concave portions. Any method can be adopted for the roughening or the formation of minor concave portions. In this case, luminance and contrast ratio of the resultant reflective type LCD apparatus 25 can be improved.

Furthermore, the protecting film 17 is entirely formed on the surface of the second conductive layer 9, thereby the substrate 23 is completed. The protecting film 17 can be obtained, for example, by applying polyimide and then sintering the resultant.

The counter substrate 24 is formed in the following manner.

First, a color filter 19 consisting of portions 19a functioning as magenta filters, portions 19b functioning as cyan filters and portions 19c functioning as yellow filters, is formed on a surface 15a of an insulating substrate 15, by a dispersing method, a dyeing method, a printing method, an electro deposition method or the like. The insulating substrate 15 is made of a translucent material such as glass. This color filter 19 is formed so that the each of the portions 19a, 19b and 19c is aligned with the respective reflective pixel electrode 9 on the substrate 23 when the counter substrate 24 is attached to the substrate 23.

Next, a plurality of strips of a transparent conductive layer are formed on the color filter 19 at a predetermined interval, as shown in FIG. 5. Each strip serves as the common electrode 20. As the material of the common electrode 20, for example, ITO (Indium Tin Oxide) can be used. The transparent conductive layer is formed to have a thickness of 1000 Å. Furthermore, a protecting film 18 is formed over the entire substrate 15 in this state to cover the common electrode 20, in order to improve smoothness. This protecting film 18 can be formed in the same manner as the protecting film 17. In this way, the counter substrate 24 is completed.

The substrate 23 and the counter substrate 24 obtained in the above-mentioned manner are arranged so that the strips of the first conductive layer 7 cross the common electrodes 20 at substantially right angles. Then, the substrates 23 and 24 are attached to form a cell, with an adhesive (not shown) including spacers having a diameter of, for example, 7 µm. Next, the cell is evacuated to vacuum, and is filled with a liquid crystal material by gradually restoring atmospheric pressure, so as to form a liquid crystal layer 21 as a display medium layer. As a result, a liquid crystal cell having the substrates 23 and 24 and the liquid crystal layer 21 interposed therebetween is completed. As the liquid crystal material, for example, a host liquid crystal material (product name ZLI 2327 manufactured by Merck & Co., Inc.) containing a dichroic dye 22 as a guest molecule, such as black dye and containing an optical activator (product name S811 manufactured by Merck & Co., Inc.) which is mixed with liquid crystal molecules 21a at 4.5%. The optical activator need not be added.

The reflective type LCD apparatus 25 having the above-mentioned structure operates as follows.

When a voltage is applied to one strip of the first conductive layer 7 working as a signal line, current flows into the reflective pixel electrode 9 via the insulating layer 8 and the upper electrode 11 of the driving MIM device. The amount of the current is determined in accordance with Poole-Frenkel characteristics of the driving MIM device consisting of the upper electrode 11, the insulating layer 8 and a part of the signal line 7. In the case where a voltage is applied to one of the common electrodes 20 at this time, a pixel which is located at a crossing of the signal line 7 and the common electrode 20 to which the voltages are applied, respectively, is selected, so that a voltage is applied to a portion of the liquid crystal layer 21 at the selected pixel. As a result, the liquid crystal molecules 21a and the dichroic dye 22 are aligned substantially perpendicular to the surfaces 14a and 15a of the substrates 14 and 15. Light which enters the LCD apparatus 25 from the substrate 15 and is incident on the portion of the liquid crystal layer 21 at the selected display, passes through the liquid crystal layer 21, is reflected by the second conductive layer 9 serving as the pixel electrode and the reflector, and then exits from the LCD apparatus 25 after passing through the liquid crystal layer 21 again.

On the other hand, a pixel at a crossing of the common electrode 20 and the signal line 7 either of which has no voltage application, is not selected. A voltage is not applied to a portion of the liquid crystal layer 21 at the non-selected pixel. For this reason, the liquid crystal molecules 21a and the dichroic dyes 22 are orientated in various directions. As a result, light incident on the non-selected pixel is absorbed by the dichroic dyes 22 and interrupted. As described above, display is carried out by transmitting and reflecting light entering the selected pixel and interrupting light entering the non-selected pixel.

The MIM device including the first conductive layer 7, the insulating layer 8 and the upper electrode 11 is used as a driving device which changes the optical properties of the liquid crystal layer 21 so as to operate the reflective type LCD apparatus 25. On the other hand, the MIM device including the first conductive layer 7, the insulating layer 8 and the upper electrode 13 is used only as a protective device and does not contribute to operating the reflecting type LCD apparatus 25, because the upper electrode 13 is not connected to the second conductive layer 9 working as the pixel electrode.

The present inventors have studied the effective settings of the size of the protective MIM device and the driving MIM device in reducing the number of pixel defects. Herein, the size of the MIM device means the size of the region where the upper electrode 13 or 11 covers the corresponding first conductive layer 7.

When a ratio of the size of the protective device to the size of the driving device was varied from 1:2, 1:3, 1:4, to 1:5, the number of pixel defects is significantly reduced in the case where the size of the protective device is equal to or less than ¼ of that of the driving device. Accordingly, it is desirable that the size of the protective device is equal to or less than ¼ of that of the driving device. For example, when the size of the driving device, which is determined by the size of the upper electrode 11 in Example 1, is 16 μm² (4 μm×4 μm), the withstand voltage of the protective device becomes low by setting the size of the protective device 4 μm² (2 μm×2 μm). Thus, the electric breakdown in the protective device can occur prior to the electric breakdown in the driving device when static electricity is generated during the manufacturing process, so that the electric breakdown in the driving device can be forestalled. Since such a protective device can be provided at each display pixel, it is possible to cope with the electric breakdown in the driving device, which is suddenly generated in an arbitrary row or column in an array of the display pixel.

As described above, in the reflective type LCD apparatus of Example 1, the first conductive layer 7 functions not only as a lower electrode of the driving MIM device and the protective MIM device, but also as a signal line. The second conductive layer 9 functions as not only a pixel electrode, but also a reflector. Accordingly, there are no regions where the signal line, the driving MIM device and the protective MIM device which do not actually function as a display screen, are not independently formed, so that the aperture ratio can be improved. Moreover, since the pixel electrode functions as a reflector, the layout of the signal line, the driving device and the protective device, which are formed immediately below the pixel electrode, does not affect the aperture ratio.

The protective MIM device is formed in the region which is positioned immediately below the second conductive layer 9, while the upper electrode 13 thereof is not connected to the second conductive layer 9 serving as the pixel electrode. That is, according to the present example, the protective device is formed inside the display pixel. Therefore, without enlarging the contour of the liquid crystal cell, pixel defects can be reduced. In addition, since the protective device can be formed at each display pixel, it is possible to cope with the electric breakdown in the driving device caused by static electricity which is suddenly generated in an arbitrary row or column in the array of the display pixels. Furthermore, the generation of the pixel defects can be significantly suppressed by making the area of the protective device one fourth of the area of the driving device.

In Example 1, a material for the upper electrode 11 for the driving device and the upper electrode 13 for the protective device can be the same as the material for the second conductive layer 9, such as aluminum (Al). In this case, it is unnecessary to form the upper electrode 11 as is formed in Example 1, as long as a part of the second conductive layer 9 is directly connected to the insulating layer 8 through the contact hole 10. In such a structure, the connected portion of the layer 9 functions as an upper electrode of the driving MIM device, and the size of the connected portion corresponds to the size of the driving MIM device.

EXAMPLE 2

Figure 6:
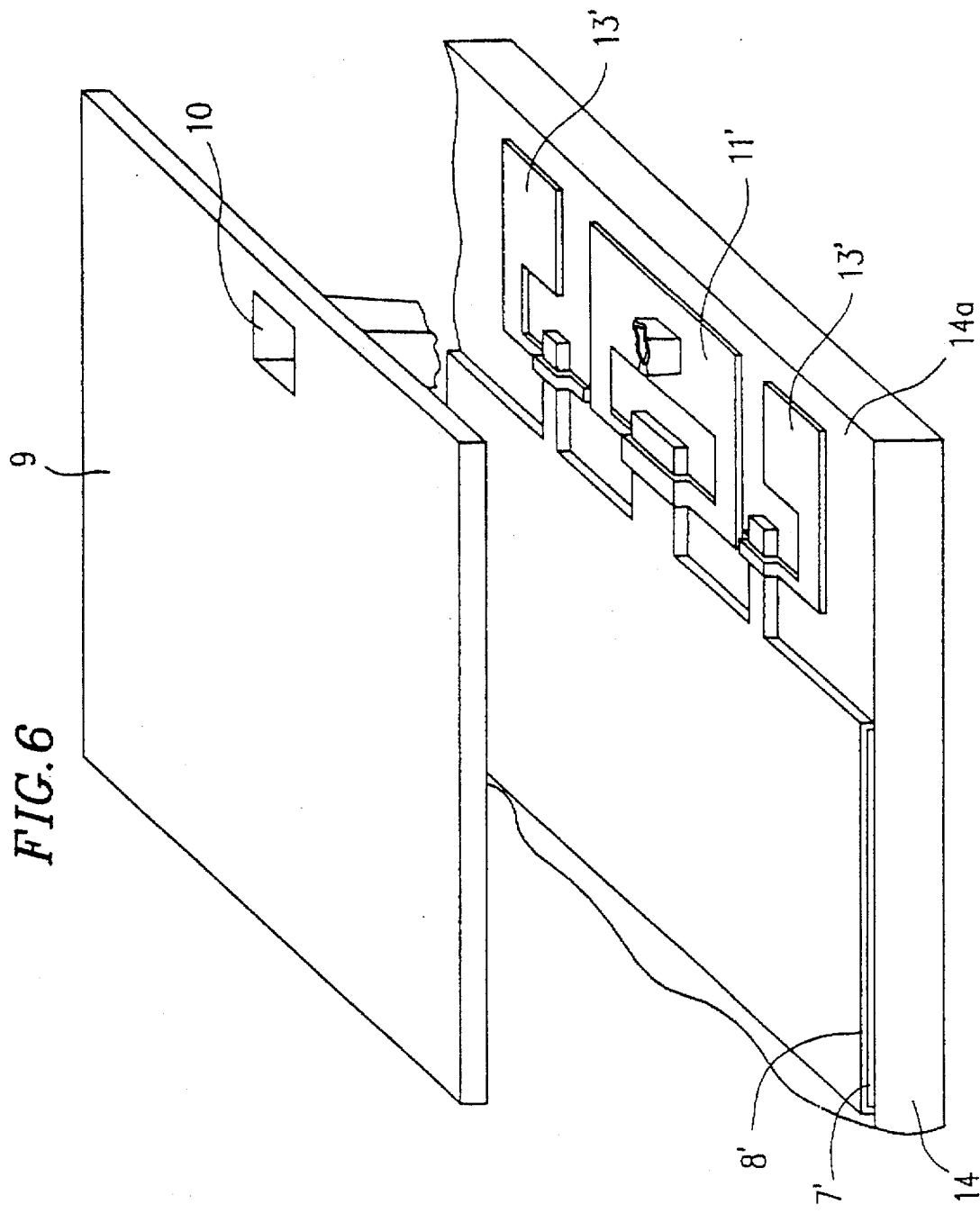
FIG. 6 is a cross sectional and perspective view of one pixel on a substrate having MIM devices of a reflective type LCD apparatus of Example 2 according to the present invention.
Figure 7:
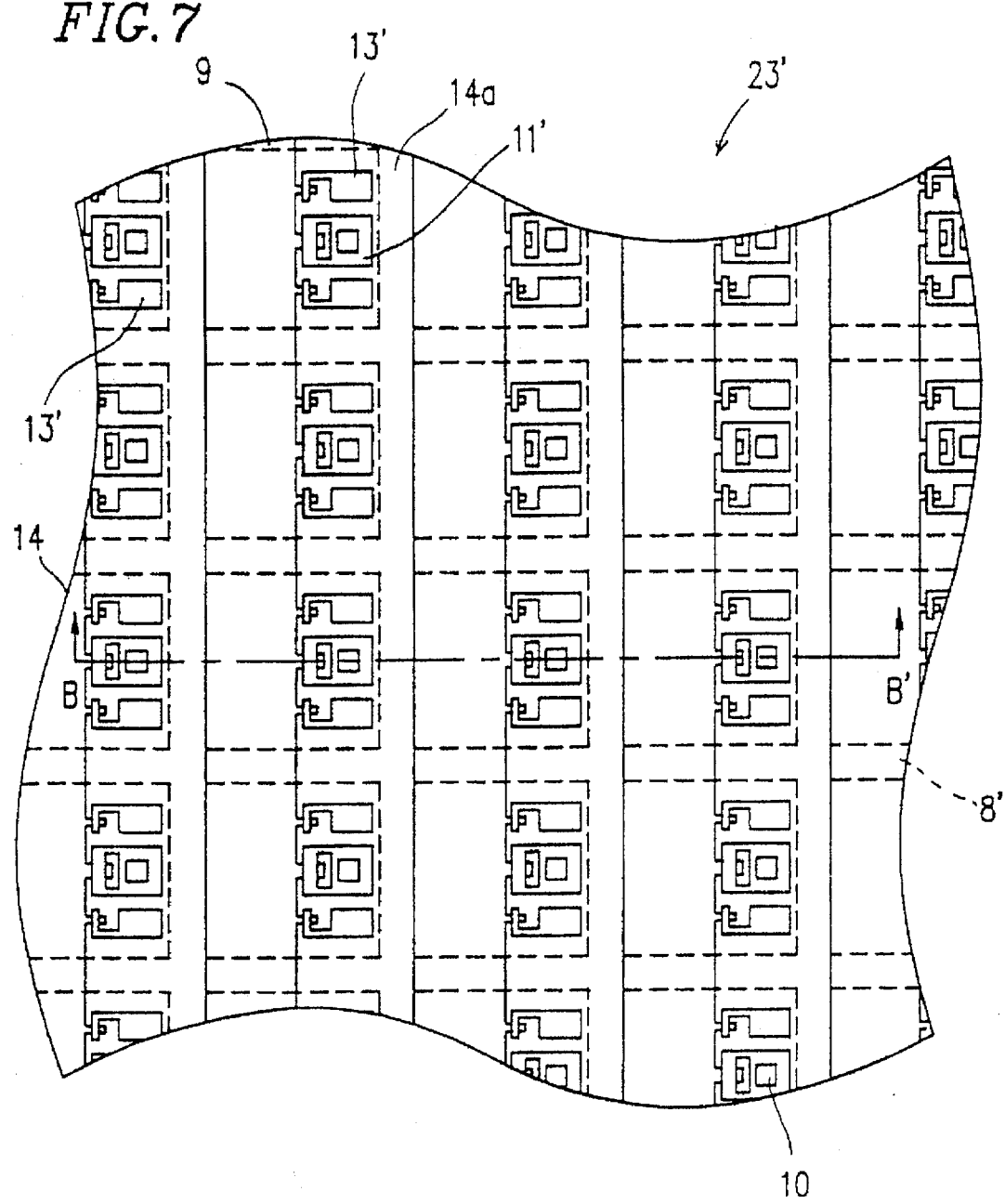
FIG. 7 is a plan view of the substrate having the MIM devices of the reflection type LCD apparatus of Example 2 according to the present invention.
Figure 8:
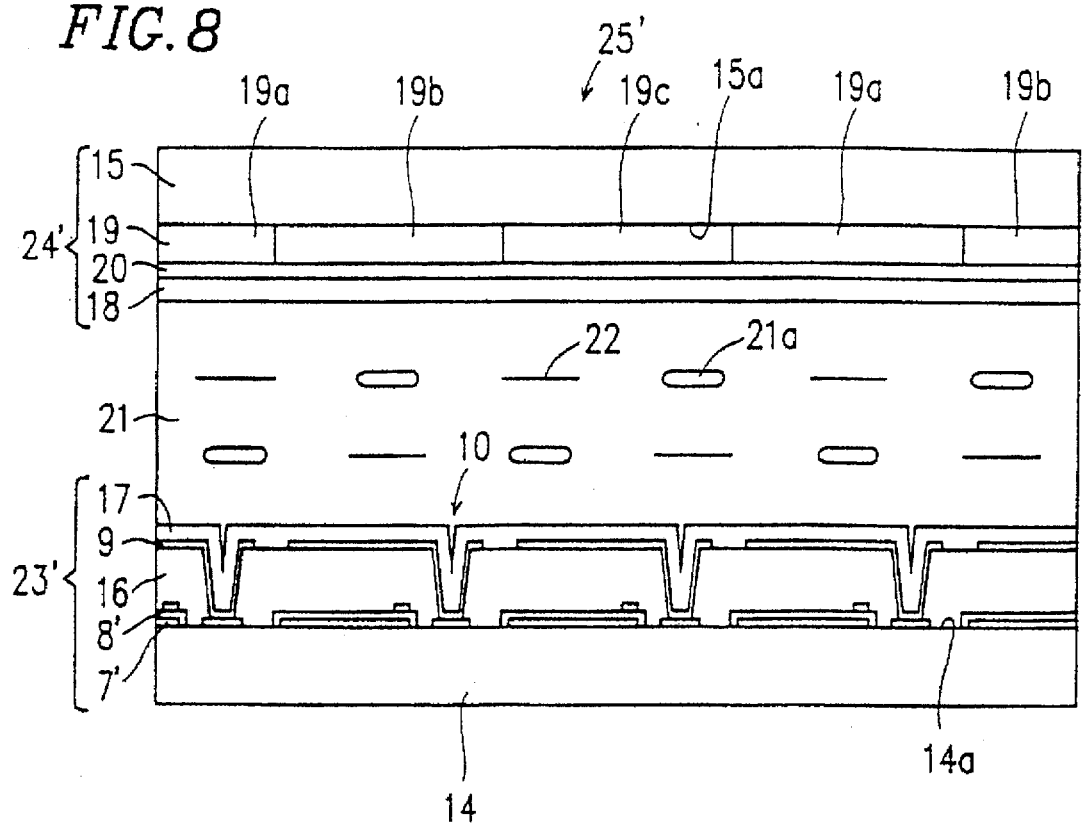
FIG. 8 is a cross sectional view of the reflective type LCD apparatus taken along the line B—B' in FIG. 7.

FIG. 6 is a cross sectional and perspective view of one pixel on a substrate having MIM devices formed thereon of a reflective type LCD apparatus of EXAMPLE 2, while FIG. 7 is a plan view thereof. FIG. 8 is a cross-sectional view of the reflective type LCD of this example taken along a line B—B' shown in FIG. 7. In this example, common electrodes are formed on a counter substrate in the same pattern as that in Example 1.

The reflective type LCD apparatus of this example has the same configuration as the reflective type LCD apparatus 25 of Example 1, except for the following points. First, some of protrusions of a first conductive layer 7' formed below a second conductive layer 9 are used as lower electrodes of the protective MIM devices, and the others are used as lower electrodes of driving MIM devices. Second, two protective MIM devices are formed in the vicinity of one driving MIM device.

The reflective LCD apparatus 25' of this example can be fabricated in the same manner as the reflective type LCD apparatus 25 of Example 1.

In the case where one protective MIM device is formed at each pixel, the protective MIM device has a sufficient effect of reducing the possibility of the electric breakdown in the driving device caused by static electricity. However, in the case where a plurality of protective devices are formed at each pixel as in this example, even though defects of the protective device such as disconnection due to making the size of the device smaller, occurs in some of the protective devices, other protective devices can remain operative. As a result, in each pixel, the absence of the protective device can be eliminated. In addition, even if the insulation in some of the protective devices is destroyed by static electricity, it is possible to cope with the electric breakdown in the driving device, in the case of the recurrence of static electricity, provided that other protective devices remain operative. Thus, the generation of pixel defects can be further suppressed.

In Example 2, an upper electrode 11' of the driving MIM device may be formed on an insulating layer 8' by a necessary area, as in Example 1, so as to be connected to the second conductive layer 9 through a contact hole 10. Alternatively, the second conductive layer 9 may be directly connected to the insulating layer 8' through the contact hole 10 so that a connecting portion of the conductive layer 9 serves as an upper electrode of the driving MIM device.

In Example 2, the protrusions of the first conductive layer 7' to serve as the lower electrodes of the driving MIM devices and the protective MIM devices. Alternatively, instead of forming the protrusions, parts of the first conductive layer 7' may be used as the lower electrodes in the same manner as the lower electrodes of the driving MIM devices in Example 1.

Figure 9:
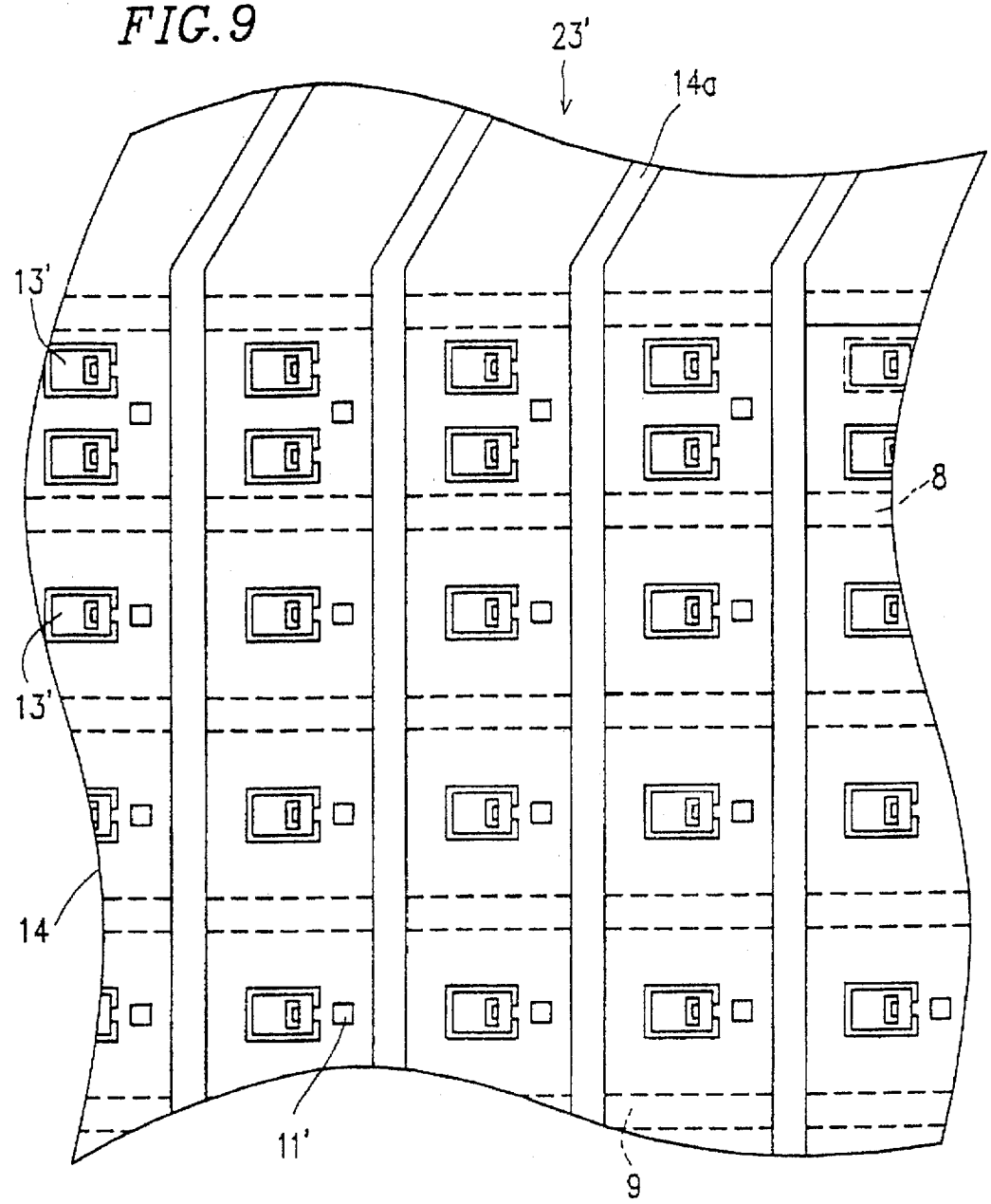
FIG. 9 is a plan view of a modification of the substrate of the reflective type LCD apparatus of Example 2 according to the present invention.
Figure 10:
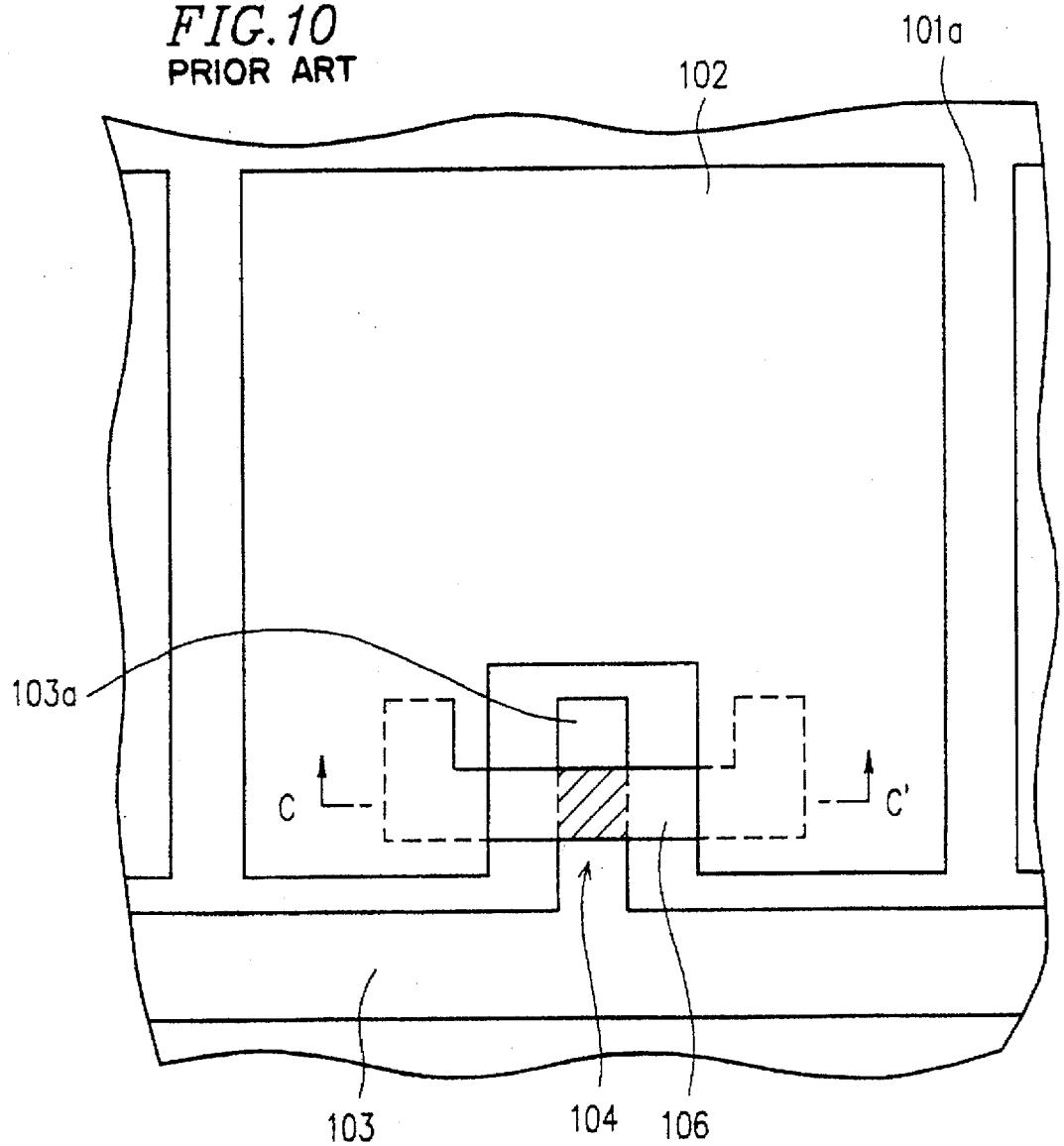
FIG. 10 is a plan view showing one pixel on a substrate of a conventional LCD apparatus including MIM devices.
Figure 11:
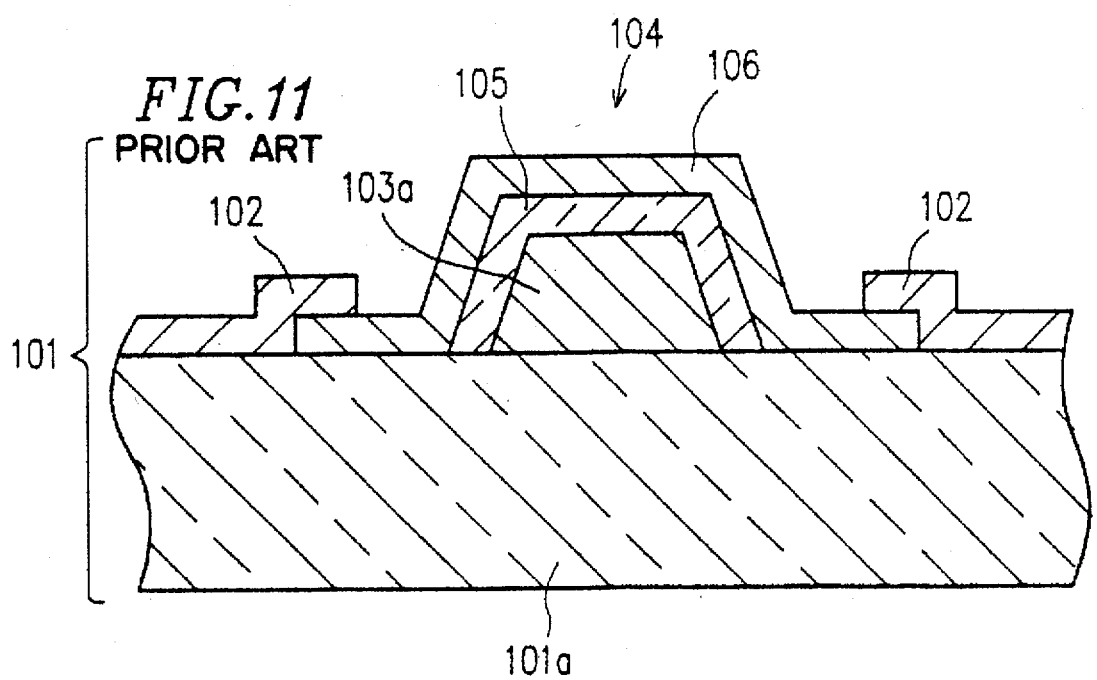
FIG. 11 is a cross sectional view of the conventional reflective type LCD apparatus taken along the line C—C' in FIG. 10.

The number of the protective devices provided at one pixel may not be constant throughout the array of the display pixels. Since pixel defects are likely to occur in the vicinity of the periphery of the display pixel array, it is possible to effectively reduce the pixel defects by providing a plurality of protective devices at the pixels at the terminal portion of the display pixel array, as shown in FIG. 9. In FIG. 9, the second conductive layer 9 is represented by a broken line in order to make it easier to read FIG. 9 compared with FIG. 7. In the substrate 23' shown in FIG. 9, two protective devices are formed at one pixel in a row closest to terminals (not shown) of the signal lines extending along the columns of the display pixel array. The terminals of the signal lines are located in the above of FIG. 9.

In the case where the display pixel array is divided in the center, the pixel defects are likely to occur at the pixels located in the vicinity of a division line at the center. In this case, the pixel defects can be effectively suppressed by providing a plurality of protective devices at the pixels in the vicinity of the division line. In this way, the generation of the pixel defects can be effectively prevented by providing a plurality of protective devices at each pixel in one row or column which is located at the periphery of the pixel array or is adjacent to the division line. However, the generation of the pixel defects can be more effectively suppressed when a plurality of the protective devices are provided at each pixel in a plurality of rows or columns which are located at the periphery of the pixel array or adjacent to the division line.

In the reflective type LCD apparatus 25 of Example 1 and the reflective type LCD apparatus 25' of Example 2, the second conductive layer 9 functions as a pixel electrode and a reflector. Therefore, examples of a material for the substrate 14 above which the second conductive layer 9 is formed include plastic, ceramics, glass and a metal plate such as an iron plate or aluminum foil. In the case where a conductive material such as a metal plate is used, it is necessary to provide an underlying film made of an insulating material on the entire surface 14a of the substrate 14 or between the substrate 14 and the first conductive layer 7 or 7'.

In Examples 1 and 2, a display mode thereof is a white tailor type in which a guest-host liquid crystal layer 21 containing dichroic dyes is used as the display medium. Alternatively, a polymer dispersed liquid crystal layer in which a plurality of crystal regions are dispersed in a polymer layer can be used as the display medium. In this case, since display is carried out without any polarizing plate, a bright display can be obtained. In addition, the present invention is also applicable to an LCD apparatus of a TN type or an STN type using one polarizing plate.

According to the present invention, a pixel electrode is formed of a reflective material to serve as a reflector, and a protective device for protecting the driving MIM device from the electric breakdown caused by static electricity, is provided on the side of the reflective pixel electrode opposite to the side adjacent to a liquid crystal layer. Therefore, it is possible to form the protective device within a display region (a region which actually contributes to display), so that a reflective LCD apparatus in which the number of pixel defects is reduced can be obtained without increasing the contour of the liquid crystal cell. In addition, by providing the protective device at each pixel, it is possible to cope with the electric breakdown in the driving device caused by static electricity which is suddenly generated and is applied to any portion in the display pixel array.

In addition, there is no region where only the components which do not actually serve as part of a display screen, such as the signal lines, the driving devices and the protective devices are formed. Therefore, it is possible to improve the aperture ratio by narrowing the gap between pixels and enlarging the area of each pixel. Moreover, since the pixel electrode functions as a reflector, the layout of the signal line, the driving devices and the protective devices which are all formed below the pixel electrodes does not affect the aperture ratio.

The generation of the pixel defect can be significantly suppressed by making the size of the protective device to be equal to or less than ¼ of that of the driving device. Furthermore, in order to effectively prevent the generation of a pixel defect, it is more effective to provide a plurality of protective devices at each pixel within a region where the pixel defect is likely to occur compared with a pixel within the other region, for example, at each pixel in one or more column or row at the periphery of the pixel array, or at each pixel in the vicinity of the division line at the center of the pixel array.

Moreover, when a liquid crystal layer as a display medium of the reflective LCD apparatus is a host nematic liquid crystal layer containing a dichroic dye as a guest molecule or a cholesteric liquid crystal layer containing a dichroic dye, or a polymeric resin layer in which a plurality of liquid crystal regions are dispersed, a bright display can be obtained, because a polarizing plate is not required.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective type liquid crystal display apparatus comprising:

a first transmissive substrate;

a second substrate disposed to face the first substrate;

a liquid crystal layer interposed between the first substrate and the second substrate, the liquid crystal layer including a plurality of pixels;

a plurality of reflective pixel electrodes arranged in rows and columns, provided on the second substrate, for applying driving voltages to the pixels;

a plurality of driving devices, provided on the second substrate, for driving the reflective pixel electrodes, respectively;

wirings formed on the second substrate and disposed beneath the respective columns of the reflective pixel electrodes; and a plurality of protective devices disposed in the vicinity of the driving devices on the second substrate, at least one of the protective devices being provided for each pixel, wherein the driving devices and the protective devices are disposed beneath the reflective pixel electrodes, and wherein each of the driving devices and the protective devices includes a lower electrode, an insulator formed on the lower electrode and an upper electrode interposed between the insulator and a corresponding one of the reflective pixel electrodes, wherein the wiring disposed beneath each reflective pixel electrode includes a first region and a second region, the wiring substantially entirely covering the first region and the wiring in the second region including at least one branch wiring strip serving as the lower electrode of the at least one protective device, wherein electric breakdown in each of the protective devices occurs prior to electric breakdown in a corresponding one of the driving devices, thereby reducing a potential difference of static electricity applied to the corresponding one of the driving devices.

2. A reflective type liquid crystal display apparatus according to claim 1, wherein the driving devices and the protective devices are MIM devices.

3. A reflective type liquid crystal display apparatus according to claim 2, further comprising:

an insulating layer formed on the wirings;

a conductive layer formed on the insulating layer, wherein the insulator of each of the driving devices and the protective devices is a part of the insulating layer, and each of the driving devices.

4. A reflective type liquid crystal display apparatus according to claim 3, further comprising another insulating layer having contact holes and being provided between the conductive layer and the reflective pixel electrodes, the reflective pixel electrodes being respectively connected to the driving devices through the contact holes.

5. A reflective type liquid crystal display apparatus according to claim 4, wherein each of the protective devices includes a part of the conductive layer as an upper electrode.

6. A reflective type liquid crystal display apparatus according to claim 5, wherein each of the driving devices includes a part of the conductive layer as an upper electrode, and the upper electrode is connected to a corresponding one of the reflective pixel electrodes through a corresponding one of the contact holes.

7. A reflective type liquid crystal display apparatus according to claim 5, wherein each of the reflective pixel electrodes includes a portion connected to the conductive layer through a corresponding one of the contact holes, the portion serving as an upper electrode of a corresponding one of the driving devices.

8. A reflective type liquid crystal display apparatus according to claim 3, further comprising a plurality of common electrodes provided on the first substrate to cross the plurality of wirings on the second substrate, wherein the plurality of reflective pixel electrodes are disposed in regions where the common electrodes and the wirings are overlapped.

9. A reflective type liquid crystal display apparatus according to claim 1, wherein a withstand voltage of the protective devices is lower than a withstand voltage of the driving devices.

10. A reflective type liquid crystal display apparatus according to claim 1, wherein the size of each of the protective devices is equal to or less than ¼ of the size of each of the driving devices.

11. A reflective type liquid crystal display apparatus according to claim 1, wherein one protective device is disposed in the vicinity of each of the driving devices.

12. A reflective type liquid crystal display apparatus according to claim 1, wherein two or more protective devices are disposed in the vicinity of each of the driving devices.

13. A reflective type liquid crystal display apparatus according to claim 1, wherein the liquid crystal layer is a guest-host liquid crystal layer.

14. A reflective type liquid crystal display apparatus according to claim 13, wherein the guest-host liquid crystal layer is either one of a host nematic liquid crystal layer containing a dichroic dye as a guest molecule, a host cholesteric liquid crystal layer containing a dichroic dye as a guest molecule, and a polymer resin layer in which liquid crystal regions are dispersed.

15. A reflective type liquid crystal display apparatus according to claim 1, wherein the second regions are a plurality of apertures provided in the wirings.

16. A reflective type liquid crystal display apparatus according to claim 1, wherein each of the wirings has a width smaller than a width of each of the columns of the reflective pixel electrodes.

17. A reflective type liquid crystal display apparatus having a pair of substrates and a liquid crystal layer interposed therebetween, one of the substrates comprising:

a plurality of reflective pixel electrodes formed in rows and columns;

a plurality of driving devices which are connected to the reflective pixel electrodes, respectively, and are disposed beneath the respective reflective pixel electrodes;

a plurality of wirings which correspond to the columns of the reflective pixel electrodes, respectively; and a plurality of protective devices disposed in the vicinity of the driving devices beneath the reflective electrodes, at least one of the protective devices being provided for each pixel, wherein each of the driving devices and the protective devices includes a part of a corresponding one of the wirings as a lower electrode, an insulator formed on the lower electrode and an upper electrode formed between the insulator and a corresponding one of the reflective pixel electrodes, wherein an aperture is provided in the wirings for each protective device, and each aperture includes a wiring portion branching from wiring surrounding the aperture serving as the lower electrode of the protective device, and wherein electric breakdown in each of the protective devices occurs prior to electric breakdown in the corresponding one of the driving devices, thereby reducing a potential difference of static electricity applied to the corresponding one of the driving devices.

18. A method of a liquid crystal display apparatus having a pair of substrates and a liquid crystal layer interposed therebetween, wherein one of the substrates includes:

a plurality of reflective pixel electrodes are formed in rows and columns; a plurality of wirings extending along the columns of the reflective pixel electrodes, respectively;

a plurality of driving MIM devices connected to the reflective pixel electrodes, respectively;

and a plurality of protecting MIM devices, at least one of the protecting MIM devices being provided for each pixel, the method comprising the steps of:

forming the wirings;

forming apertures in the wirings so that the apertures include wiring portions which branch from wiring surrounding the apertures, the branching wiring portions serving as lower electrodes of the protecting MIM devices;

forming a first insulator to cover the wirings;

partially forming conductive pieces on the first insulator, the conductive pieces serving as upper electrodes of the driving MIM devices and the protecting MIM devices;

forming a second insulator on the wirings, the first insulator and the conductive pieces, the second insulator having contact holes which are located above the conductive so as to reach the conductive pieces; and forming the reflective pixel electrodes on the second insulator, wherein the driving MIM devices and the protecting MIM devices are positioned beneath the reflective pixel electrodes.

* * * * *